UNITED STATES PATENT OFFICE.

GEORGE H. KURTZ, OF MEADVILLE, PENNSYLVANIA.

DUPLICATING COMPOSITION.

1,321,760. Specification of Letters Patent. Patented Nov. 11, 1919.

No Drawing. Application filed March 6, 1919. Serial No. 281,063.

*To all whom it may concern:*

Be it known that I, GEORGE H. KURTZ, a citizen of the United States, residing at Meadville, in the county of Crawford and State of Pennsylvania, have invented certain new and useful Improvements in Duplicating Compositions, of which the following is a specification.

This invention has for its object to provide a plastic composition for duplicating letters either written or typewritten, or printed and also for duplicating drawings, although the invention is not necessarily limited to such use as the compound may be used for dental purposes as for making impressions of the mouth and gums.

Another object is the provision of a compound or composition of this character possessing desirable qualities such as quick setting properties and economy of manufacture.

The invention consists of a compound composed of kaolin 53%, glycerin 31.8%, dextrin 4.5% and dental plaster 10.7%.

The ingredients are thoroughly mixed in the proportions above stated and duplicators consisting of the composition are manufactured in various sizes.

Owing to the pliability and quick setting properties of the composition it is certainly adapted for duplicating letters, drawings and the like.

What I claim is:

1. The herein described composition of matter consisting of kaolin, glycerin, dextrin and dental plaster.

2. The herein described composition of matter consisting of kaolin 53%, glycerin 31.8%, dextrin 4.5% and dental plaster 10.7%.

In testimony whereof, I affix my signature hereto.

GEORGE H. KURTZ.